(12) United States Patent
Davisdon et al.

(10) Patent No.: US 8,186,751 B2
(45) Date of Patent: May 29, 2012

(54) PIVOTAL FAN/GRILL UNIT FOR A WORK VEHICLE

(75) Inventors: Matt Davisdon, Dubuque, IA (US); Piyush Maheshwari, Maharashtra (IN)

(73) Assignee: Deere & Company, Moline, IL (US)

( * ) Notice: Subject to any disclaimer, the term of this patent is extended or adjusted under 35 U.S.C. 154(b) by 132 days.

(21) Appl. No.: 12/774,886

(22) Filed: May 6, 2010

(65) Prior Publication Data

US 2011/0272967 A1    Nov. 10, 2011

(51) Int. Cl.
  *B60R 19/52*    (2006.01)
(52) U.S. Cl. .................................................. 296/193.1
(58) Field of Classification Search .............. 296/193.1; 180/68.1, 68.4
See application file for complete search history.

(56) References Cited

U.S. PATENT DOCUMENTS

| | | | | |
|---|---|---|---|---|
| 3,334,704 A * | 8/1967 | Gehrke et al. | ............... | 180/68.4 |
| 3,834,478 A * | 9/1974 | Alexander et al. | ........... | 180/68.6 |
| 3,938,586 A * | 2/1976 | Barlow et al. | ................... | 165/51 |
| 4,287,961 A * | 9/1981 | Steiger | ......................... | 180/68.4 |
| 4,696,361 A * | 9/1987 | Clark et al. | ................... | 180/68.4 |
| 5,036,700 A | 8/1991 | Knestel | | |
| 5,234,051 A | 8/1993 | Weizenburger | | |
| 5,785,139 A | 7/1998 | Freedy et al. | | |
| 6,092,616 A | 7/2000 | Burris et al. | | |
| 6,386,306 B2 * | 5/2002 | Contoli et al. | ............... | 180/68.4 |
| 6,505,696 B1 * | 1/2003 | Prevost | ......................... | 180/68.4 |
| 6,648,088 B2 * | 11/2003 | Gabioli | ......................... | 180/68.4 |
| 6,842,689 B2 | 1/2005 | Andres et al. | | |
| 6,871,697 B2 | 3/2005 | Albright et al. | | |
| 6,920,387 B2 | 7/2005 | Landes et al. | | |
| 7,089,994 B2 | 8/2006 | Esposito et al. | | |
| 7,255,189 B2 * | 8/2007 | Kurtz et al. | ................... | 180/68.4 |
| 7,261,173 B2 * | 8/2007 | Kurtz et al. | ................... | 180/69.2 |
| 7,320,299 B2 * | 1/2008 | Eavenson et al. | ........... | 123/41.49 |
| 7,370,690 B2 * | 5/2008 | Rasset et al. | ..................... | 165/41 |
| 7,401,672 B2 * | 7/2008 | Kurtz et al. | ................... | 180/68.4 |
| 7,426,909 B2 * | 9/2008 | Keane et al. | ................ | 123/41.29 |
| 7,753,152 B2 * | 7/2010 | Nakae et al. | ................... | 180/68.1 |
| 7,950,443 B2 * | 5/2011 | Rasset et al. | ..................... | 165/41 |
| 2005/0095121 A1 | 5/2005 | Vithani | | |
| 2006/0219451 A1 | 10/2006 | Schmitt | | |
| 2007/0007061 A1 | 1/2007 | Meyer et al. | | |
| 2009/0038775 A1 | 2/2009 | Leconte | | |

FOREIGN PATENT DOCUMENTS

GB    2332507 A    6/1999
GB    2446549 B    11/2010

OTHER PUBLICATIONS

Deere 750J 850J Crawler Dozer Brochure (24 pages) (Oct. 2009).
Deere 750J 850J Crawler Dozer Brochure (24 pages) (May 2009).

* cited by examiner

*Primary Examiner* — Hilary Gutman

(57) ABSTRACT

A work vehicle comprises a tractor and a fan/grill unit. The fan/grill unit comprises a fan and a grill providing a portion of the exterior of the work vehicle. The fan and the grill are separately pivotally mounted to the tractor. The fan and the grill are coupled to one another in a four-bar linkage arrangement with the tractor such that the fan/grill unit is configured to pivot relative to the tractor between a closed position and an opened position.

20 Claims, 10 Drawing Sheets

US 8,186,751 B2

PIVOTAL FAN/GRILL UNIT FOR A WORK VEHICLE

FIELD OF THE DISCLOSURE

The present disclosure relates to a pivotal fan/grill unit for a work vehicle.

BACKGROUND OF THE DISCLOSURE

Many work vehicles have a grill and a fan. The grill is mounted to the tractor of the vehicle to form a portion of the exterior of the work vehicle. The grill screens out large debris or other objects and protects against impacts. The fan is sometimes mounted to the tractor just inward of the grill, and is driven to advance air across one or more heat exchangers of the vehicle to provide a cooling effect.

SUMMARY OF THE DISCLOSURE

According to an aspect of the present disclosure, a work vehicle comprises a tractor and a fan/grill unit. The fan/grill unit comprises a fan and a grill providing a portion of the exterior of the work vehicle. The fan and the grill are separately pivotally mounted to the tractor. The fan and the grill are coupled to one another in a four-bar linkage arrangement with the tractor such that the fan/grill unit is configured to pivot relative to the tractor between a closed position and an opened position. As such, the fan/grill unit may be opened to facilitate internal access to the tractor for servicing or otherwise (e.g., to clean the cores of one or more heat exchangers behind the fan/grill unit, to clean debris from the fan/grill unit).

The above and other features will become apparent from the following description and the attached drawings.

BRIEF DESCRIPTION OF THE DRAWINGS

The detailed description of the drawing refers to the accompanying figures in which.

DETAILED DESCRIPTION OF THE DRAWINGS

Figure 1:
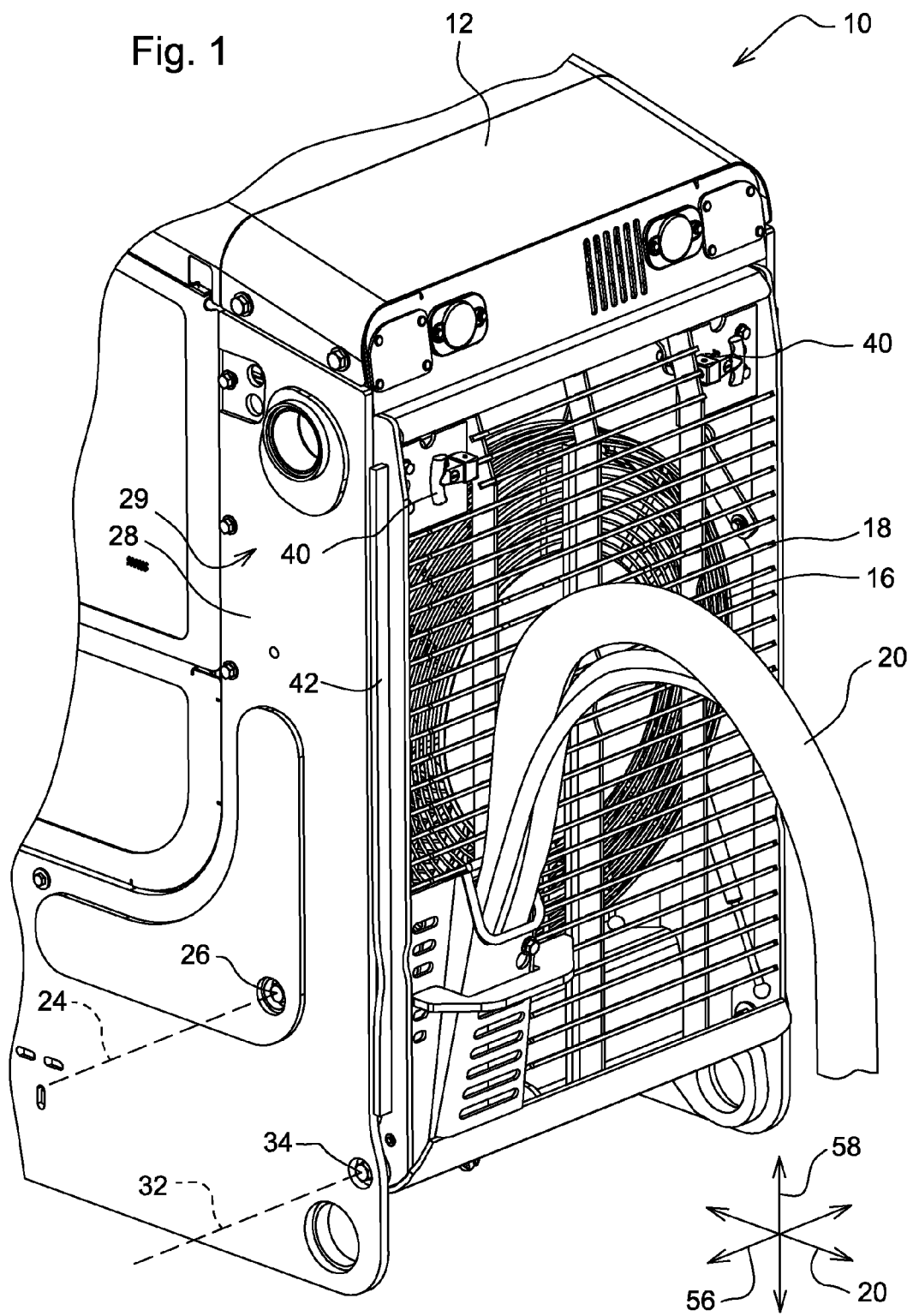
FIG. 1 is a perspective view showing a first embodiment of a fan/grill unit mounted to a tractor of a work vehicle.
Figure 2:
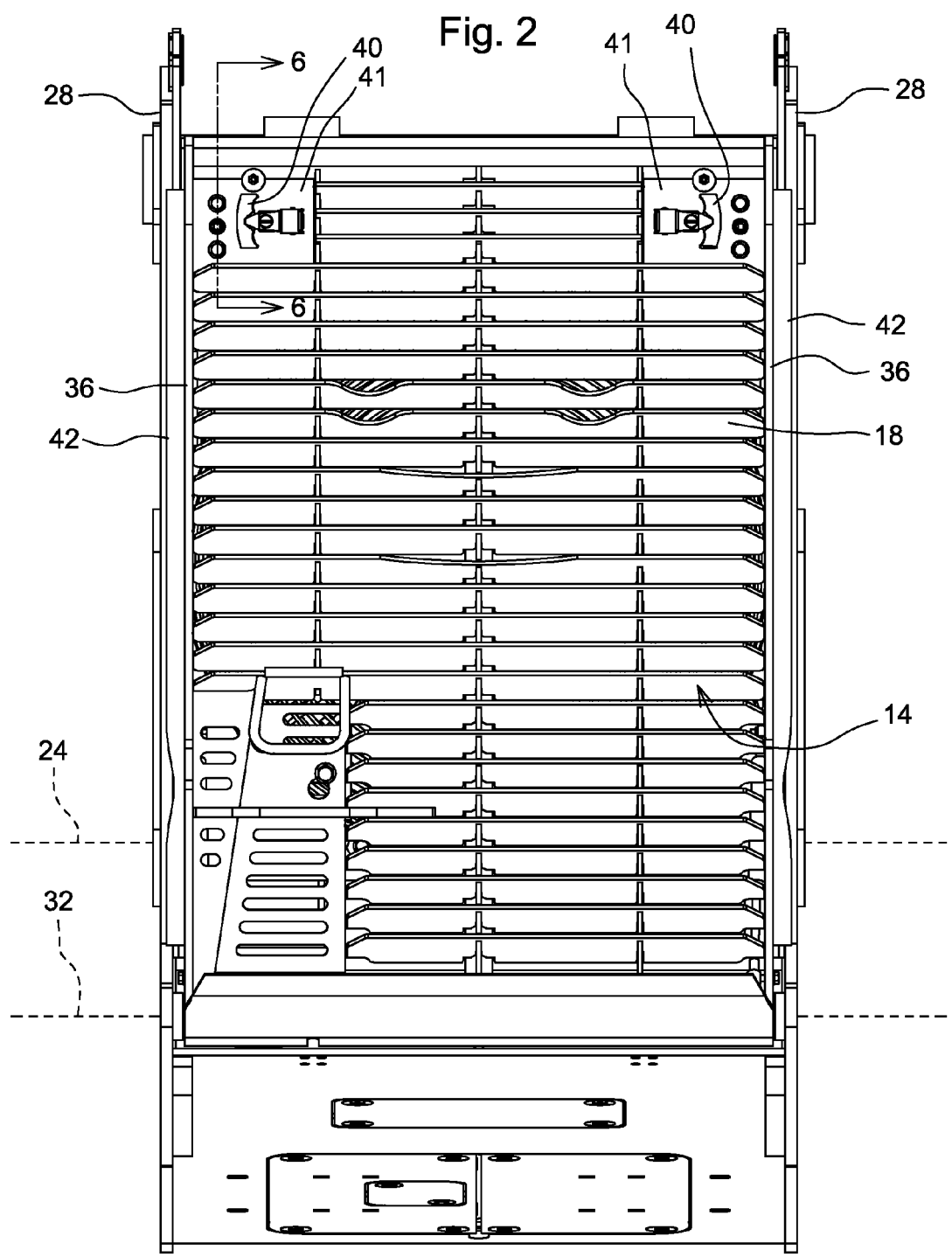
FIG. 2 is a front elevation view showing the first embodiment of the fan/grill unit.
Figure 3:
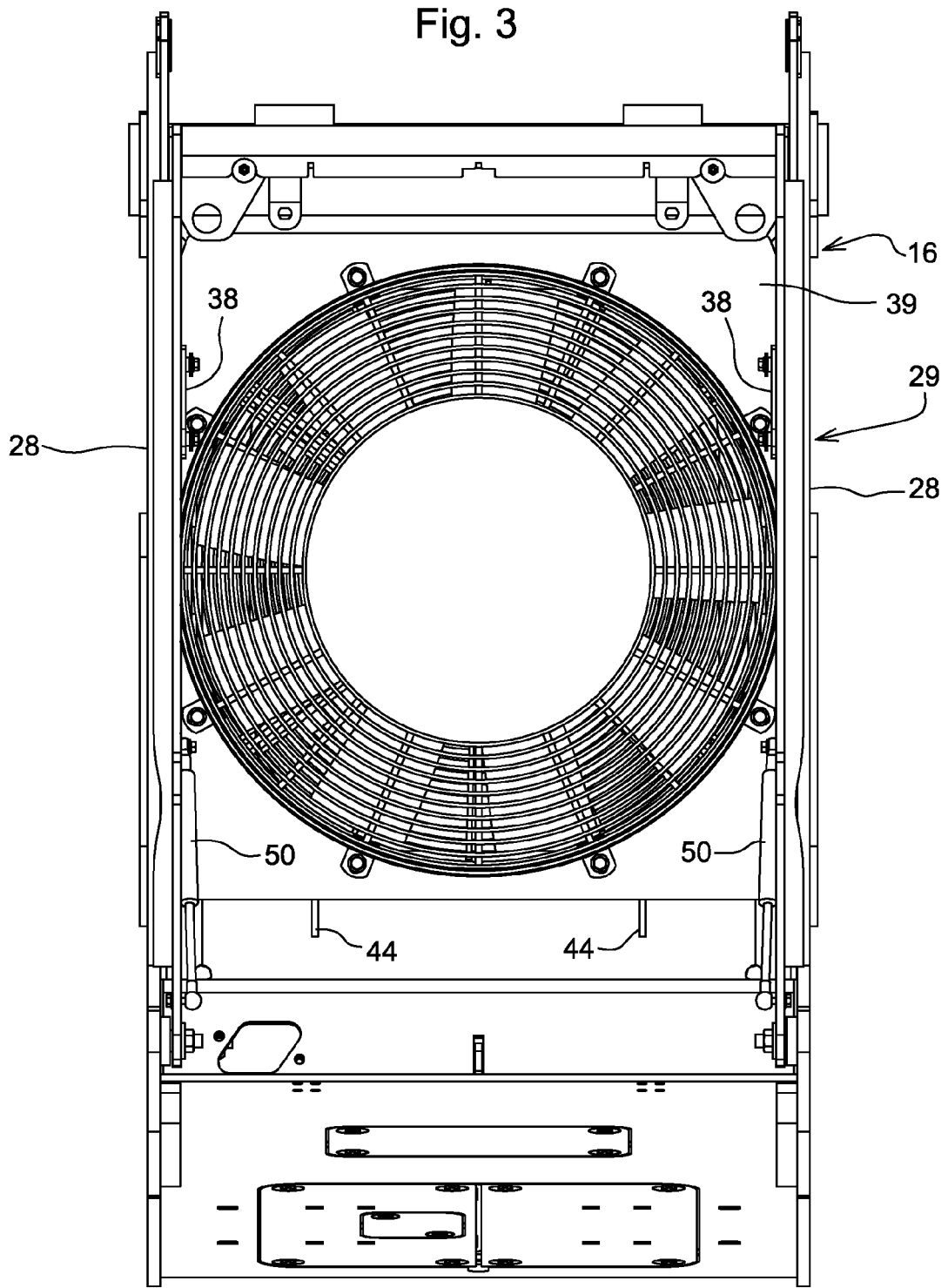
FIG. 3 is front elevation view showing a pair of assist devices connected between the fan and the grill in the first embodiment of the fan/grill unit.

Referring to FIGS. 1-3, an exemplary work vehicle 10 may have a tractor 12 and a fan/grill unit 14. The fan/grill unit 14 may have a fan 16 and a grill 18 providing a portion of the exterior of the vehicle 10. The fan 16 and the grill 18 may be separately pivotally mounted to the tractor 10. The fan 16 and the grill 18 may be coupled to one another in a four-bar linkage arrangement with the tractor 12 such that the fan/grill unit 14 may be configured to pivot relative to the tractor 10 between a closed position (FIG. 4) and an opened position (FIG. 5).

The fan/grill unit 14 may be used with a wide variety of work vehicles. For example, the vehicle 10 may, illustratively, take the form of a crawler dozer. In such a case, the grill 18 may provide a front face of the tractor 12 of the vehicle 10, and may be used to screen out large debris or other objects and to protect against impacts. Further, the fan 16 may be hydraulically driven and may be used as a cooling fan for cooling a number of heat exchangers of a cooling package of the vehicle 10. The heat exchangers may include, for example, a transmission oil cooler, a hydraulic oil cooler, a charge-air cooler, and a radiator for engine coolant, and may be positioned behind the fan/grill unit 14 within a compartment of the tractor 12. The fan/grill unit 16 may be opened to facilitate internal access to the tractor 10 for servicing or otherwise (e.g., to clean the cores of one or more of the heat exchangers behind the fan/grill unit 14, to clean debris from the fan/grill unit 14).

The fan/grill unit 14 may be pivoted to the tractor 12 such that the fan/grill unit 14 is configured to pivot in a first or fore-aft dimension 20 of the tractor 12 between the opened and closed positions. Bottom portions of the fan 16 and the grill 18 may be separately pivotally mounted to the tractor 12 such that the fan/grill unit 16 may be configured to pivot downwardly and forwardly toward the opened position and upwardly and rearwardly toward the closed position.

A hose 22, or, illustratively, a group of hoses, may extend through the grill 18 via a sloping channel mounted thereto. The hoses may be hydraulic hoses associated with one or more functions of an implement of the vehicle 10 (e.g., blade function hoses for the functions of a blade of a crawler dozer). Pivoting of the fan/grill unit 16 from the bottoms of the fan 16 and the grill 18 may effectively accommodate such extension of the hose(s) through the grill 18 so as to minimize stresses on the hose(s).

The fan 16 may include a blade, a motor, a fan grill, and a shroud. The blade may be encased within the fan grill. The motor (e.g., a hydraulic motor) and the fan grill may be mounted to the shroud. The motor may be coupled to the blade to rotate the blade.

The fan 16 may be pivotally mounted to the tractor 12 to pivot about a fan pivot axis 24 between the opened and closed positions, the fan pivot axis 24 illustratively being horizontal. The shroud may be pivoted to the tractor 10 by use of a pivot axle 26 on either lateral side of the tractor 12. At each pivot axle 26, a cap screw may extend laterally inwardly through an annular first boss welded to a laterally inward side of a side panel 28 of a frame 29 of the tractor 12 (illustratively, the mainframe of the tractor 12), a through-hole of a side plate 30 of the shroud, and an annular second boss welded to a laterally inward side of the side plate 30, and may also extend through a bushing (e.g., steel bushing that may be hardened and zinc-plated for corrosion protection) that is positioned within the first boss and the through-hole of the side plate 30 and that abuts the head of the cap screw at one end and the second boss at the other end so as to be captured therebetween (without welding of the bushing to any component). The cap screw may be threaded to a nut welded to the second boss so as to tighten the head of the cap screw against the bushing for rotation of the bushing within the first boss upon pivotal movement of the unit 14, the head being protectively inset within a through-hole of the side panel 28. It is to be understood that any suitable pivot axle may be used for the axle 26.

The grill 18 may be pivotally mounted to the tractor 12 to pivot about a grill pivot axis 32 between the opened and closed positions, the grill pivot axis 32 illustratively being horizontal. The grill 18 may be pivoted to the tractor 12 by use of a pivot axle 34 on either lateral side of the tractor 12. At each pivot axle 34, a cap screw may extend laterally inwardly through an annular first boss welded to a laterally inward side of a side panel 28 of the frame 29 of the tractor 12, a through-hole of a side plate 36 of the grill 18, and an annular second boss welded to a laterally inward side of the side plate 36, and may also extend through a bushing (e.g., steel bushing that may be hardened and zinc-plated for corrosion protection) that is positioned within the first boss and the through-hole of the side plate 36 and that abuts the head of the cap screw at one end and the second boss at the other end so as to be captured therebetween (without welding of the bushing to any component). The cap screw may be threaded to a nut welded to the second boss so as to tighten the head of the cap screw against the bushing for rotation of the bushing within the first boss upon pivotal movement of the unit 14, the head being protectively inset within a through-hole of the side panel 28. It is to be understood that any suitable pivot axle may be used for the axle 34.

The fan 16 and the grill 18 may thus be mounted separately to the frame 29 separately. As such, the frame 29 may provide individual weight support to the fan 16 and the grill 18 on the frame 29 so as to minimize stresses on each axis 24, 32 and the associated axle components 26, 34, rather than putting all the weight of the fan 16 and the grill 18 on a single axis and associated axle components if the fan 16 were mounted onto the grill 18 or vice versa.

Figure 4:
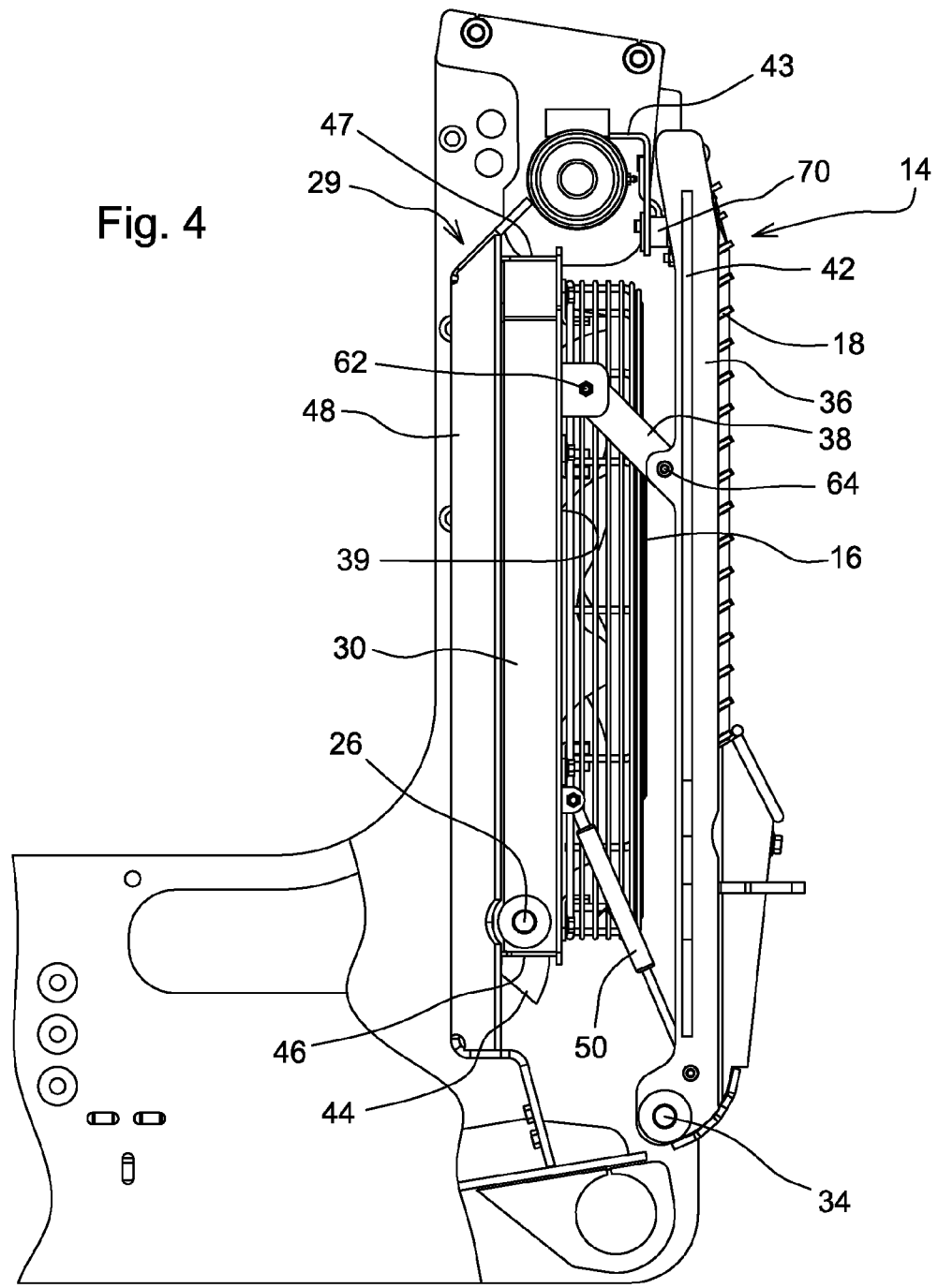
FIG. 4 is a side elevation view showing the first embodiment of the fan/grill unit in a closed position.
Figure 5:
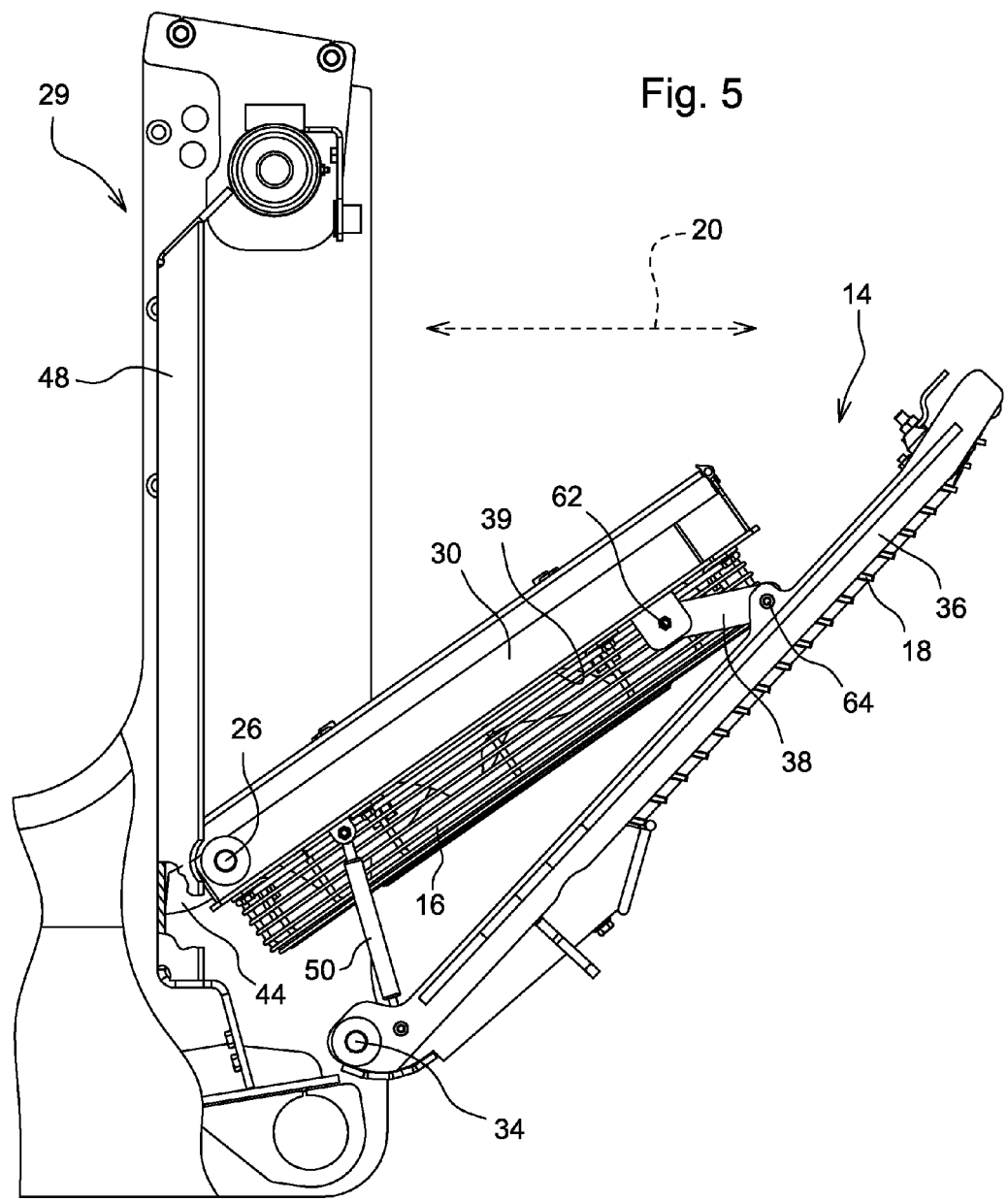
FIG. 5 is a side elevation view showing the first embodiment of the fan/grill unit in an opened position.

Referring to FIGS. 4 and 5, the fan 16 and the grill 18 may be linked to one another to complete the four-bar linkage arrangement. The frame 29 (the side panels 28 and the first bosses welded thereto) may provide the ground "bar" of the four-bar linkage arrangement. The fan 16 and the grill 18 may provide respectively the two grounded "bars" of the four-bar linkage arrangement. A pair of non-extendable links 38 connected between the fan 16 and the grill 18 may provide the coupler "bar" of the four-bar linkage arrangement. In the four-bar linkage arrangement, the center of gravity may be located between the pivot axles 26, 34 for suitable balancing of the unit 14.

Each link 38 may be pivotally coupled to the fan 16 and the grill 18 adjacent to respective sides thereof to facilitate pivotal movement of the fan/grill unit 14. For example, each link 38 may be pivotally coupled to a pivot axle 62 of the fan 16 and a pivot axle 64 of the grill 18.

With respect to the pivot axle 62 of the fan 16, a flanged cap screw may extend laterally outwardly through a washer, a bushing positioned within a through-hole of a fan end portion of the link 38 and on which the link 38 may pivot, and a through-hole in a forwardly projecting shroud tab of a respective shroud side plate 30 (such tab projecting forwardly and integrally from an edge of the shroud side plate 30 through a slot in a front panel 39 of the shroud). The cap screw may be threaded to a nut welded to a laterally outer surface of the shroud tab such that tightening of the cap screw captures the bushing between the washer and the shroud tab for pivotal movement of the link 38 on the bushing. In an another embodiment of the pivot axle of the fan 16 (e.g., for a larger crawler dozer as in FIGS. 7-10), the flanged cap screw may extend laterally inwardly through the shroud tab, the bushing, and the washer, with the cap screw threaded to a nut welded to the washer such that tightening of the cap screw captures the bushing between the washer and the shroud tab for pivotal movement of the link 38 on the bushing.

With respect to the pivot axle 64 of the grill 18, a flanged cap screw may extend laterally outwardly through a washer and a bushing, positioned within a through-hole of a grill end portion of the link 38 and on which the link 38 may pivot, into a flanged hexagonal nut received in and welded to a corresponding hexagonal through-hole in a rearwardly projecting grill tab of a respective grill side plate 36 (such tab projecting rearwardly from an edge of the grill side plate 36). Tightening of the cap screw thus captures the bushing between the washer and the grill tab for pivotal movement of the link 38 on the bushing. In another embodiment of the pivot axle of the grill 18 (e.g., for a larger crawler dozer as in FIGS. 7-10), a cap screw may extend laterally outwardly through the bushing and the grill tab (without the washer). The cap screw may be threaded to a nut welded to a laterally outer surface of the grill tab such that tightening of the cap screw captures the bushing between the head of the cap screw and the grill tab for pivotal movement of the link 38 on the bushing.

It is to be understood that any suitable pivot axles may be used to mount the links 38. For example, the axles may be fixed to the links, rather than the fan 16 and the grill 18, so as to be included in the links.

Referring to FIG. 2, the fan/grill unit 14 may be latched releasably to the tractor 12 in the closed position by use of a pair of latches 40. Such latching blocks movement of the fan/grill unit 14 in the fore-aft dimension 20 of the vehicle 10. The first and second latches 40 may be mounted respectively to the grill 18 at upper corner regions thereof, in particular to first and second corner plates 41 in such upper corner regions. The latches 40 may latch against a generally L-shaped plate 43 of the frame 29 welded to a cross tube 45 of the frame 29 to which a torsion plate 48 of the frame 29 may be welded (the plates 43, 48 and tube 45 shown, for example, in FIG. 4). Each end of the cross tube 45 may extend through the respective side panel 28 and an internal and an external doubler plate welded respectively to the laterally inner and outer surfaces of the side panel 28 and may be welded to such doubler plates. The plate 43 may be positioned in front of and welded to the cross tube 43 and may be welded at its ends to the two internal doubler plates.

The torsion plate 48 may be positioned between and welded to the side panels 28 of the frame 29 and may be welded at the bottom to a floor plate of the frame 29 and at the top to the cross tube 45 rearwardly thereof. The torsion plate 48 may be positioned behind the fan 16 and formed to include a large hole in communication with the fan 16 for communication of pressurized air therethrough (e.g., to suction air past the heat exchangers through such hole). The grill 18 may thus be latchable to the frame 29. As such, the fan 16 is indirectly latchable via the linked connection between the fan 16 and the grill 18.

The tube 45 may be used in connection with an outside dozer configuration of the vehicle 10 in which the two push beams of a blade frame for driving the blade are positioned respectively laterally outwardly of the tracks of the undercarriage, the blade being mounted to roll (also known as tilt) and pitch. In such a case, the tube 45 may be used for mounting hydraulic blade-lift cylinders to opposite sides of the tractor 12. Each cylinder may be coupled to a trunnion mounted to a yoke which is mounted to a respective end of the tube 45.

Referring to FIG. 4, the fan/grill unit 14 may have a pair of impact-transfer members 42. The members 42, each in the form of, for example, a bar, may be welded or otherwise mounted respectively to the grill side plates 36 so as to extend along and laterally outwardly from the plates 36. In the closed position of the fan/grill unit 14, the members 42 may be positioned respectively in front of the front peripheral edges of the side panels 28 for contact therewith in response to an impact on the grill 18 in order to transfer the impact loading to the frame 29.

In the closed position of the unit 14, a seal, in the form of, for example, four sealing strips coupled respectively to the two shroud side plates 30, a shroud bottom plate 46, and a shroud top plate 47, may contact the torsion plate 48, promoting effective fluid communication between the fan 16 and the compartment behind the fan 16 and the torsion plate 48.

Figure 6:
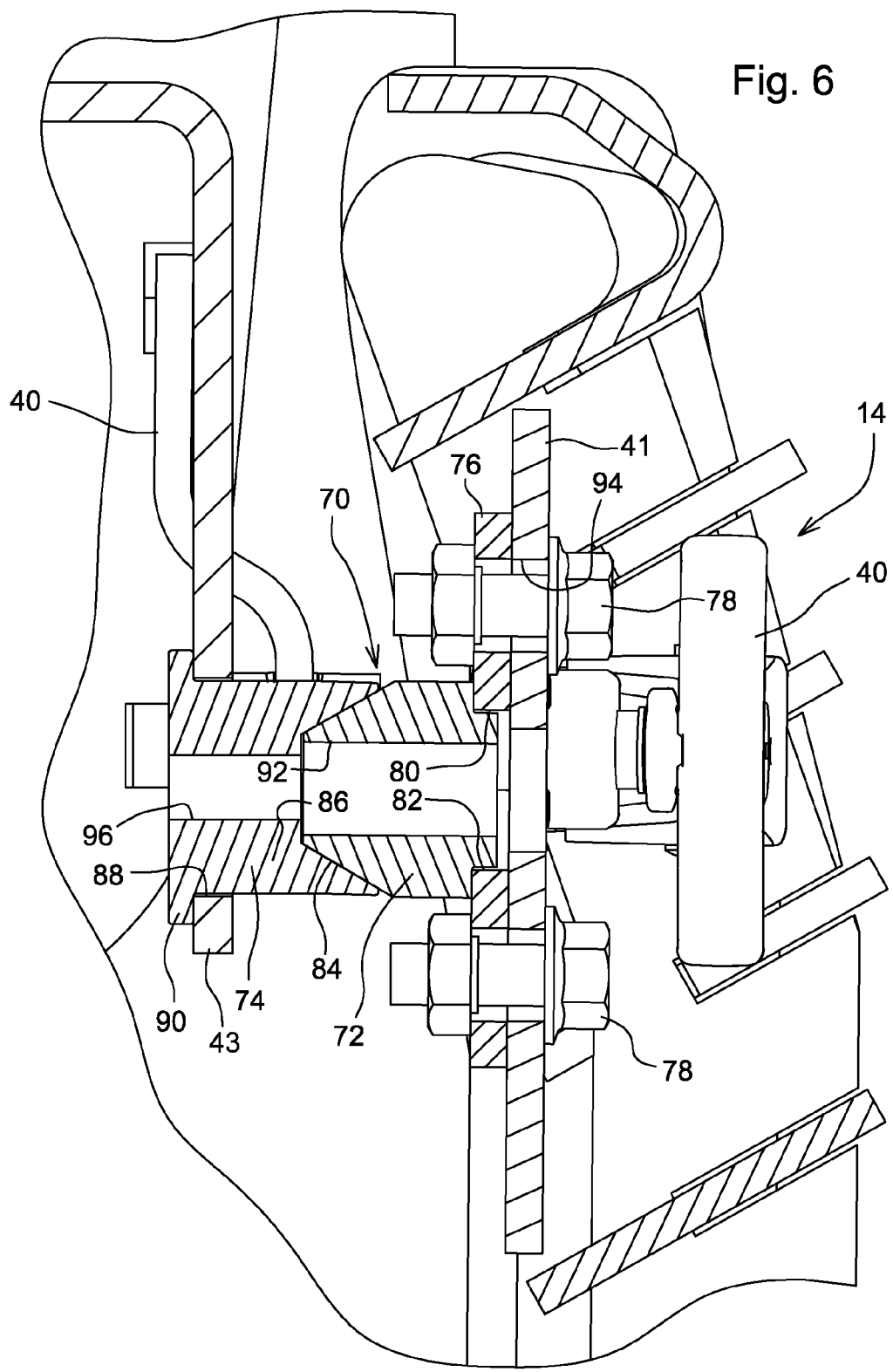
FIG. 6 is a sectional view taken along lines 6-6 of FIG. 2 showing a load-relief device.
Figure 7:
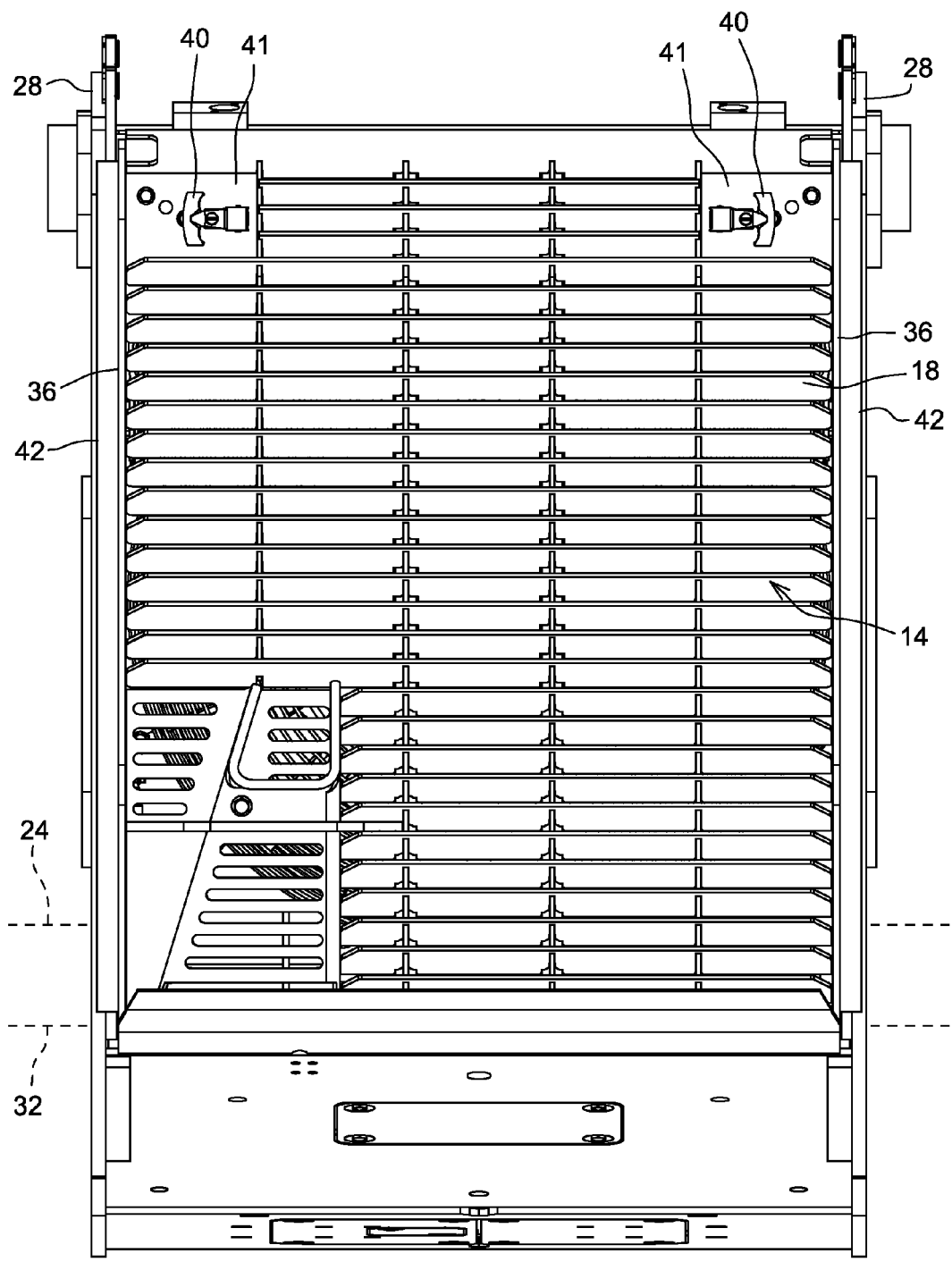
FIG. 7 is a front elevation view showing a second embodiment of the fan/grill unit.
Figure 8:
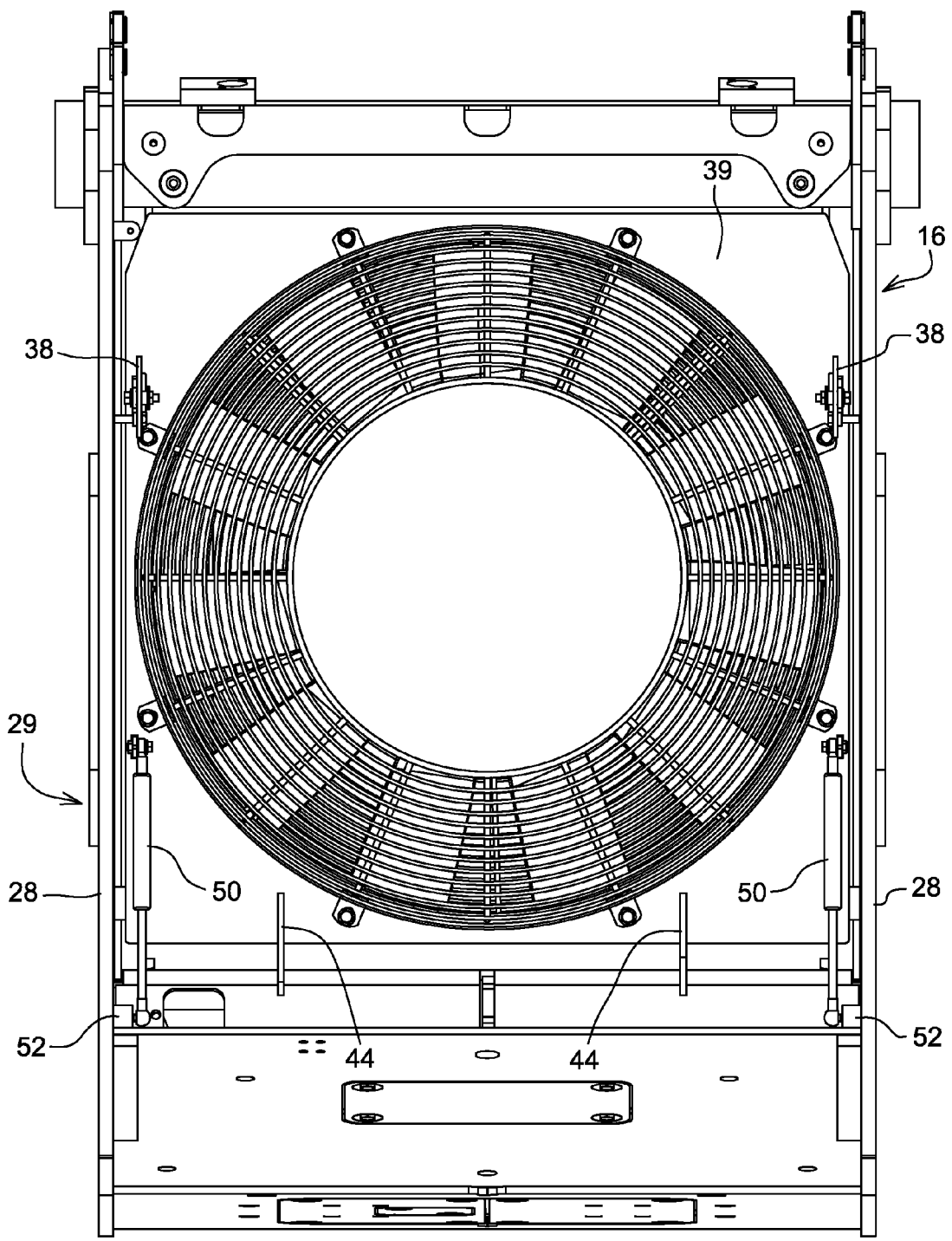
FIG. 8 is a front elevation view showing a pair of assist devices connected between the frame of the tractor and the fan in the second embodiment of the fan/grill unit.
Figure 9:
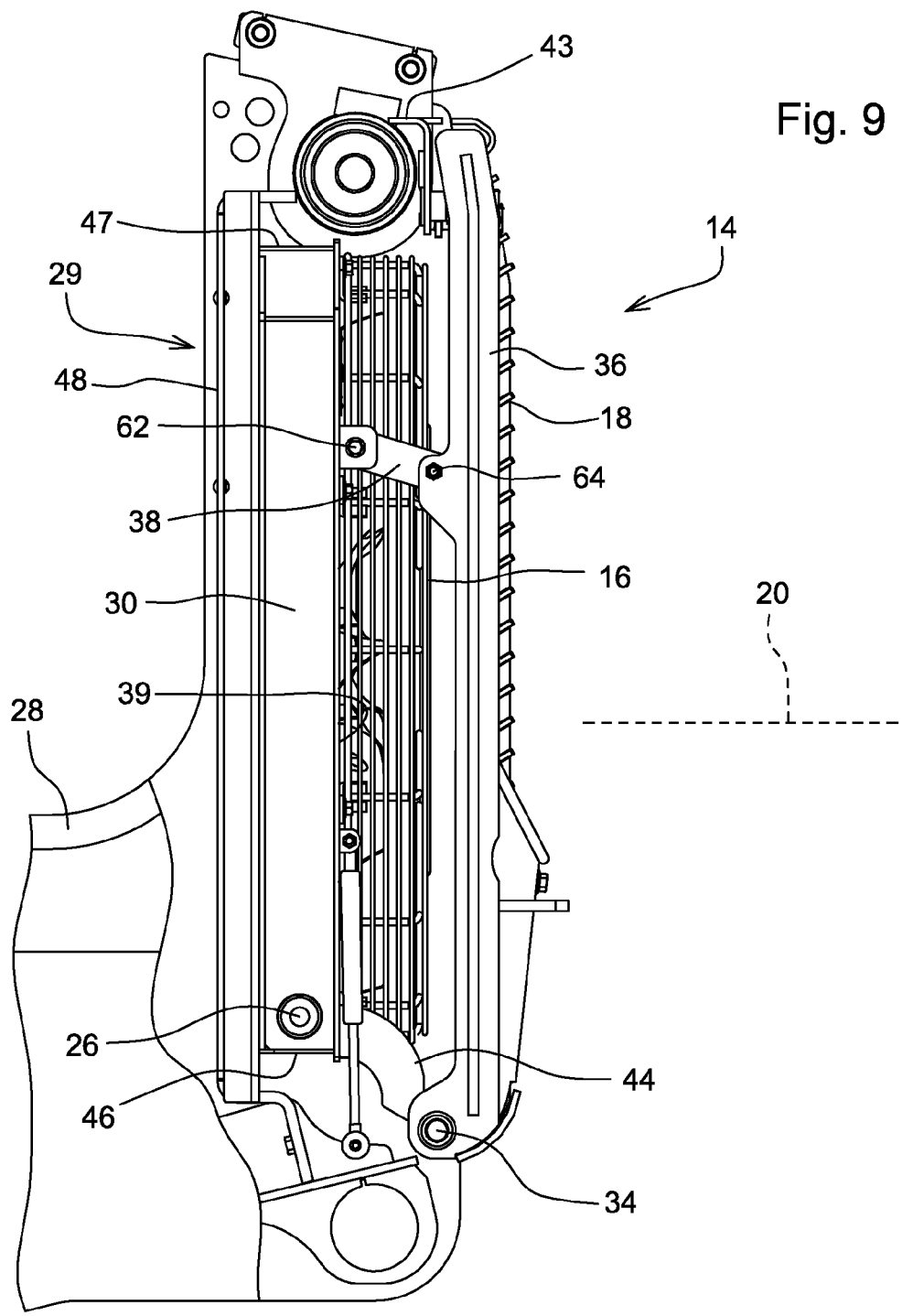
FIGS. 9 and 10 are side elevation views showing the second embodiment of the fan/grill unit in closed and opened positions, respectively.
Figure 10:
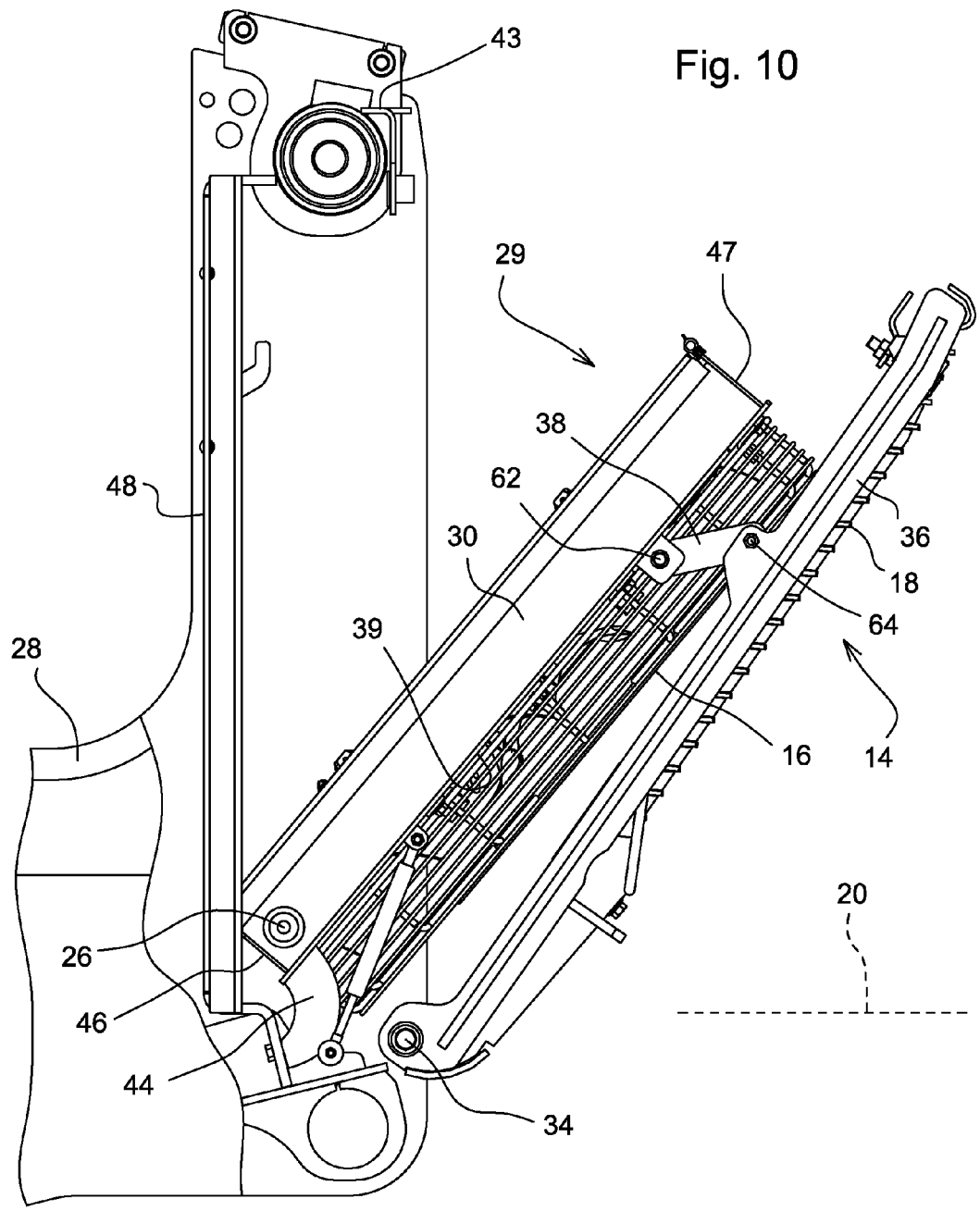

Referring to FIG. 6, a pair of load-relief devices 70 (one of which is shown in FIG. 6, the other being like it) may be coupled to the fan/grill unit 14 and the tractor 12 and may be configured to relieve the latches 40 of compressive, inertial loads (from vibration, etc.) in a second or vertical dimension 56 of the vehicle 10 and a third or lateral dimension 58 of the vehicle 10 (all three dimensions 20, 56, 58 shown in FIG. 1). Each of the first and second load-relief devices 70 may include a male member 72 and a female member 74. The male member 72 may be mounted to the fan/grill unit 14 or the tractor 12, illustratively, the grill 18 of the fan/grill unit 14. The female member 74 may be mounted to the other of the fan/grill unit 14 or the tractor 12, illustratively, the plate 43 of the frame 29. The female member 74 is configured to receive the male member 72 in the closed position.

The first and second load-relief devices 70 may be coupled respectively to the corner plates 41 such that the devices 70 are positioned respectively laterally outwardly of the latches 40 in the corner regions of the grill 18. Each load-relief device 70 may include an elongated mounting plate 76 that is fastened to the back of a respective corner plate 41 and oriented vertically (or diagonally on, for example, a larger crawler dozer as in FIGS. 7-10) by use of a pair of fasteners 78, each including a cap screw and a corresponding nut that may be welded to the mounting plate 76.

The male member 72 may be welded or otherwise mounted to the mounting plate 76. The male member 72 may have a proximal, neck-down portion 80 received matingly within a through-hole 82 of the mounting plate 76 and a distal, frusto-conical portion 84. In the closed position, the frusto-conical portion 84 may be received matingly within an interior frusto-conical portion 86 of the female member 74.

The female member 74 may extend through a through-hole 88 of the plate 43 and may have an annular flange 90. The flange 90 may be welded or otherwise mounted to the plate 43. In addition to handling inertial loads in the vertical and lateral dimensions, the devices 70 may act to center the grill 18 between the side panels 28 of the frame 29.

In heavy duty applications, the fan/grill unit 14 may be provided with secondary locking to lock the fan/grill unit 14 in the closed position against movement in the fore-aft dimension 20. The male and female members 72, 74 may cooperate to define a bore 92 therethrough in alignment with the through-hole 82 of the mounting plate 76 and a through-hole 94 of the respective corner plate 41. The bore 92 and the through-holes 82, 94 may be unthreaded except for a threaded portion 96 in the female portion 74 (threads not shown). In heavy duty applications, a cap screw may be inserted through the through-holes 82, 94 and the unthreaded portion of the bore 92 into the threaded portion 96 in order to lock the grill 18, and thus the unit 14, to the frame 29.

Referring to FIGS. 3-5, the fan/grill unit 14 may have a pair of opened-position stops 44. The stops 44, each in the form of, for example, a plate, may be welded or otherwise mounted to the shroud bottom plate 46 so as to depend therefrom. When the unit 14 assumes the opened position (FIG. 5), the stops 44 may contact the torsion plate 48 of the tractor 12, blocking pivotal movement of the unit 14 beyond the opened position.

Referring to FIGS. 3 and 4, a pair of assist devices 50 may be positioned to assist pivotal movement of the fan/grill unit 14 between the opened and closed positions. The first and second assist devices 50 may be positioned to urge the fan/grill unit 14 toward the closed position throughout the range of travel of the fan/grill unit 14 between the opened and closed positions. The assist devices 50 may be positioned respectively to laterally opposite sides of the fan/grill unit 14 (FIG. 3), and may be configured as gas shocks, such as, for example, air shocks, in a compressed state throughout the range of travel of the fan/grill unit 14 between the opened and closed positions.

The first and second assist devices 50 may connect between the fan 16 and the grill 18 so as to be pivotally coupled to the fan 16 and the grill 18. Such connection may be particularly useful when there is not much space between the fan 16 and the grill 18, as in perhaps a smaller crawler dozer or other work vehicle. As gas shocks (e.g., air shocks), the assist devices 50 may be in a compressed state so as to exert a force in the closing direction on the fan 16 and a force in the opening direction on the grill 18. However, in such a case, the assist devices 50 may be pivotally coupled to the fan 16 and the grill 18 at locations relative to the fan and grill pivot axes 24, 32 so as to create a net moment in the closing direction of the unit 16. The moment arm of the closing force on the fan 16 may be larger than the moment arm of the opening force on the grill 18 so as to create such a net closing moment on the unit 16 throughout its range of travel.

Exemplarily, the first and second assist devices 50 may be pivotally coupled respectively to the shroud side plates 30 of the fan 16 and to the grill side plates 36 of the grill 18. As such, a fan end of each assist device 50, configured, for example, as a spherical bearing, may be pivotally coupled to the respective shroud side plate 30 by use of a cap screw which extends laterally outwardly through the fan end and a tab, projecting forwardly from an edge of the shroud side plate 30 through a slot of the front panel 39 of the shroud, such that the cap screw is threaded to a nut welded to the tab so as to retain the fan end on the cap screw.

An opposite, grill end of each assist device 50, configured, for example, as a socket (e.g., included in a plastic end cap of the device 50), may be pivotally coupled to the respective grill side plate 36 by use of a flanged ball stud. The ball of the ball stud may be received in the socket of the grill end to establish a ball-and-socket connection therebetween in the form of a ball joint in which the ball may be retained in the socket by use of a spring clip retainer. A washer may be captured between the flange of the ball stud and a laterally inner surface of the grill side plate 36. The threaded shank of the ball stud may extend laterally outwardly through the washer into the threaded hole of a flanged hexagonal nut received in and welded to a corresponding hexagonal through-hole of the grill side plate 36 such that the shank may be threaded to the nut and the flange of the nut may contact the laterally outer surface of the grill side plate 36.

Referring to FIGS. 7-10, there is a shown another embodiment of the fan/grill unit 16. This second embodiment is similar in structure and function to the first embodiment shown in FIGS. 1-6. As such, the same reference numbers are used to identify similar structures. The second embodiment is larger than the first embodiment, and may thus be used with larger crawler dozers or other work vehicles.

A difference between the two embodiments relates to the assist devices 50. In particular, the assist devices 50 may connect between the fan 16 and the tractor 12 (rather than the grill 18) so as to be pivotally coupled to the fan 16 and the tractor 12. Such connection may be particularly useful when there is more space between the fan 16 and the grill 18, as in perhaps a larger crawler dozer or other work vehicle. The first and second assist devices 50 may be positioned to urge the fan/grill unit 14 toward the closed position throughout the range of travel of the fan/grill unit 14 between the opened and closed positions. The assist devices 50 may be positioned respectively to laterally opposite sides of the fan/grill unit 14 (FIG. 8), and may be configured as gas shocks, such as, for example, air shocks, in a compressed state throughout the range of travel of the fan/grill unit 14 between the opened and closed positions.

As gas shocks (e.g., air shocks), the assist devices 50 may be configured so as to exert a closing force on the fan 16 and thus the unit 14 throughout the range of travel of the unit 14. The assist devices 50 may be in a compressed state in the closed position, and compress further upon movement of the unit 14 in the opening direction. The assist devices 50 may thus apply a closing moment to the fan 16 and thus the unit 14 throughout the range of travel of the unit 14.

Exemplarily, the first and second assist devices 50 may be pivotally coupled to the fan shroud and to the side panel 28 of the tractor 12. A fan end of each assist device 50, configured, for example, as a spherical bearing, may be pivotally coupled to the respective shroud side plate 30 of the fan shroud by use of a cap screw which extends laterally outwardly through the fan end and a tab, projecting forwardly from an edge of the shroud side plate 30 through a slot of the front panel 39 of the shroud, such that the cap screw is threaded to a nut welded to the tab so as to retain the fan end on the cap screw.

An opposite, tractor end of each assist device 50, configured, for example, as a socket (e.g., included in a plastic end cap of the device 50), may be pivotally coupled to the respective side panel 28 of the frame 29 of the tractor 12 by use of a flanged ball stud. The ball of the ball stud may be received in the socket of the tractor end to establish a ball-and-socket connection therebetween in the form of a ball joint in which the ball may be retained in the socket by use of a spring clip retainer. The threaded shank of the ball stud may extend laterally outwardly into the threaded hole of an annular boss welded to the laterally inner surface of the respective side panel 28, while the flange of the ball stud may contact the boss. In the case of a thinner boss, there may be one or more washers (e.g., two) captured between the flange and the boss such that the shank extends laterally outwardly through the washer(s) into the boss with the washer or washer stack in contact with the flange and the boss (the assist device 50 may be inclined somewhat to accommodate a thinner boss at the tractor end).

During assembly of the unit 14 to the tractor 12, the fan 16 may first be coupled to the frame 29 by use of the pivot axles 34. The grill 18 may then be assembled to the frame 29 in the opened position by use of the pivot axles 34. The links 38 may then be coupled to the fan 16 and the gill 18 to complete the four-bar linkage arrangement. Afterwards, the assist devices 50 may be installed.

In use, the fan/grill unit 14 may be normally closed. A person may wish to open the fan/grill unit 14, in order, for example, to gain access to components behind the fan/grill unit 14 to service them (e.g., to clean the cores of one or more heat exchangers), to facilitate cleaning of the fan/grill unit 14, or other reason. To open the fan/grill unit 14, a person may unlatch the latches 40 and pivot the fan/grill unit 14 in the opening direction to the opened position, exposing an interior region of the tractor 12. Afterwards, a person may close the fan/grill unit 14 by pivoting it in the closing direction back toward the closed position and re-latching the fan/grill unit 14 in the closed position. The two load-relief devices 70 may re-engage as the fan/grill unit 14 assumes the closed position so as to provide lateral and vertical load relief for the latches 40 and to center the grill 18 between the side panels 28.

Since the fan 16 and the grill 18 may be rather heavy for a person, the assist devices 50 may bear at least some of the weight of the unit 14 to a degree helpful to a person opening and closing the unit 14. According to ISO 2867 (i.e., Standard 2867 of the International Organization for Standardization), the maximum force required to open hinged doors is not to exceed 245 Newtons (about 55 pounds-force). In the first embodiment of the fan/grill unit 14 (FIGS. 1-6), the fan 16 and the grill 18 may have a mass of 72 kilograms and 94 kilograms, respectively, and, in the second embodiment of the fan/grill unit 14 (FIGS. 7-10), the fan 16 and the grill 18 may have a mass of 76 kilograms and 124 kilograms, respectively. The assist devices 50 are configured to provide sufficient assistance to satisfy ISO 2867. The assist devices 50 may tend to close the unit 14, or hold it open, under their own power throughout the range of travel of the unit 14 or only in certain portion(s) of that range.

Since the fan 16 and the grill 18 are combined into a unit 14, there may be exactly two assist devices 50, making efficient use of available, limited space (e.g., as illustrated). If the fan 16 and the grill 18 were not so unitized, four assist devices may be required, two for the fan 16 and two for the grill 18, being more costly and taking up more space than may be available or otherwise space inefficient.

Implementation of the four-bar linkage arrangement may thus offer a number of benefits. As alluded to above, it may provide coordinated motion of the fan 16 and the grill 18 such that they move together between the opened and closed positions. As further alluded to above, it may be space efficient and reduce the number of assist devices 50. It may provide individual weight support to the fan 16 and the grill 18 on the frame 29 so as to minimize stresses on each axis 24, 32 and the associated axle components 26, 34, rather than putting all their weight on a single axis and associated axle components if the fan 16 were mounted onto the grill 18 or vice versa. Given the simplicity of its construction, it may eliminate or otherwise reduce service issues.

In the two illustrated embodiments, the vehicle 10 takes the form of an outside dozer. In another embodiment, the vehicle 10 may take the form of another type of dozer in which the fore-aft portions of the blade frame are positioned between the tracks of the undercarriage rather than outside the tracks, the blade being mounted, for example, to yaw (also known as angle) and roll (also known as tilt) by hydraulic power and to pitch by mechanical adjustment. In such a case, the blade-lift cylinders may be mounted at a location lower than in the outside dozer. As such, the plate 43 and the cross tube 45 may be replaced by a generally inverted V-shaped upper torsion plate welded to the torsion plate 48 and to the side panels 28 (the internal and external doubler plates may be omitted in the absence of the cross tube 45) and against which the latches 40 may latch (such an inverted V-shaped plate would perform the functions of the plate 43 discussed herein). As alluded to above, the fan/grill unit 14 may be used with a wide variety of work vehicles.

While the disclosure has been illustrated and described in detail in the drawings and foregoing description (welds not shown but understood), such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A work vehicle comprising:
   a tractor, and
   a fan-and-grill unit comprising a fan and a grill providing a portion of the exterior of the work vehicle, the fan and the grill separately pivotally mounted to the tractor, the fan and the grill coupled to one another in a four-bar linkage arrangement with the tractor such that the fan-and-grill unit is configured to pivot relative to the tractor between a closed position and an opened position.

2. The work vehicle of claim 1, further comprising a first assist device and a second assist device, and the first and second assist devices are positioned to urge the fan-and-grill unit toward the closed position.

3. The work vehicle of claim 2, wherein the first and second assist devices are positioned to urge the fan-and-grill unit toward the closed position throughout the range of travel of the fan-and-grill unit between the opened and closed positions.

4. The work vehicle of claim 2, wherein the first and second assist devices connect between the fan and the grill.

5. The work vehicle of claim 2, wherein the first and second assist devices connect between the fan and the tractor.

6. The work vehicle of claim 2, wherein the first and second assist devices are gas shocks.

7. The work vehicle of claim 1, wherein the fan-and-grill unit comprises at least one non-extendable link that is included in the four-bar linkage arrangement and is coupled between the fan and the grill.

8. The work vehicle of claim 7, wherein the tractor comprises a frame, and the fan and the grill are separately pivotally mounted to the frame such that the frame is included in the four-bar linkage arrangement.

9. The work vehicle of claim 1, wherein the tractor comprises a frame, and the fan and the grill are separately pivotally mounted to the frame such that the frame is included in the four-bar linkage arrangement.

10. The work vehicle of claim 1, further comprising at least one stop mounted to the fan-and-grill unit and positioned to contact the tractor in the opened position of the fan-and-grill unit.

11. The work vehicle of claim 10, wherein the at least one stop is mounted to the fan.

12. The work vehicle of claim 1, wherein the fan-and-grill unit is pivoted to the tractor such that the fan-and-grill unit is configured to pivot in a fore-aft dimension of the tractor.

13. The work vehicle of claim 12, wherein bottom portions of the fan and the grill are separately pivotally mounted to the tractor such that the fan-and-grill unit is configured to pivot downwardly and forwardly toward the opened position and upwardly and rearwardly toward the closed position.

14. The work vehicle of claim 13, further comprising a hose extending through the grill.

15. The work vehicle of claim 1, further comprising a latch and a load-relief device, the latch is configured to latch the fan-and-grill unit in the closed position against movement in a first dimension, and the load-relief device is coupled to the fan-and-grill unit and the tractor and is configured to relieve the latch of inertial loads in a second dimension and a third dimension.

16. The work vehicle of claim 15, wherein the load-relief device comprises a male member mounted to the fan-and-grill unit or the tractor and a female member mounted to the other of the fan-and-grill unit or the tractor and configured to receive the male member in the closed position.

17. The work vehicle of claim 16, wherein the latch and the male member are mounted to the grill, the male member is mounted to the grill, and the female member is mounted to a frame of the tractor.

18. The work vehicle of claim 1, wherein the tractor comprises a frame, the fan is pivotally mounted to the frame to pivot about a fan pivot axis, the grill is pivotally mounted to the frame to pivot about a grill pivot axis different from the fan pivot axis.

19. The work vehicle of claim 1, wherein the tractor, the fan, and the grill provide separate bars of the four-bar linkage.

20. The work vehicle of claim 1, wherein the tractor comprises a frame to which the fan and the grill are separately pivotally mounted to pivot respectively about a fan pivot axis and a grill pivot axis different from the fan pivot axis, the frame provides a ground bar of the four-bar linkage, the fan provides a first grounded bar of the four-bar linkage, the grill provides a second grounded bar of the four-bar linkage, and the four-bar linkage comprises a coupler bar connected between the fan and the grill.

* * * * *